United States Patent [19]

Menich et al.

[11] Patent Number: 5,594,946
[45] Date of Patent: Jan. 14, 1997

[54] METHOD AND APPARATUS FOR MITIGATING INTERFERENCE PRODUCED BY A COMMUNICATION UNIT IN A COMMUNICATION SYSTEM

[75] Inventors: Barry J. Menich, Schaumburg, Ill.; Akingbade R. Akinniyi, Carrollton, Tex.

[73] Assignee: Motorola, Inc., Schaumburg, Ill.

[21] Appl. No.: 396,025

[22] Filed: Feb. 28, 1995

[51] Int. Cl.$^6$ .................................................. H04B 7/26
[52] U.S. Cl. ..................... 455/54.1; 455/56.1; 455/63; 455/67.1; 455/69; 455/70
[58] Field of Search .................................. 455/33.1, 33.2, 455/54.1, 54.2, 56.1, 63, 67.1, 69, 70; 375/205

[56] References Cited

U.S. PATENT DOCUMENTS

| 4,613,990 | 9/1986 | Halpern | 455/33 |
|-----------|--------|---------|--------|
| 4,696,027 | 9/1987 | Bonta | 379/60 |
| 4,811,421 | 3/1989 | Havel et al. | 455/69 |
| 5,265,119 | 11/1993 | Gilhousen et al. | 375/205 |
| 5,287,544 | 2/1994 | Menich et al. | 455/63 |
| 5,293,641 | 3/1994 | Kallin et al. | 455/63 |

*Primary Examiner*—Chi H. Pham
*Attorney, Agent, or Firm*—Richard A. Sonnentag; Daniel C. Crilly

[57] ABSTRACT

A communication system (100) employs a method (400) and apparatus (101, 113) for mitigating interference (119) produced by a communication unit (113) communicating with a serving base site (101) in the communication system (100). While the communication unit (113) is communicating with the serving base site (101), the communication unit (113) monitors (405) a downlink communication signal (118) transmitted by an alternate base site (105). The communication unit (113) then determines (407) an indicia of signal usability for the monitored downlink signal (118) and adjusts (421) a transmit power of the communication unit (113) based on the indicia of signal usability.

17 Claims, 4 Drawing Sheets

METHOD AND APPARATUS FOR MITIGATING INTERFERENCE PRODUCED BY A COMMUNICATION UNIT IN A COMMUNICATION SYSTEM

FIELD OF THE INVENTION

The present invention relates generally to mitigating interference in a communication system and, in particular, to mitigating interference produced by a communication unit in a communication system.

BACKGROUND OF THE INVENTION

Communication systems are known to comprise a plurality of base sites that provide communication services to communication units located in corresponding service coverage areas of the base sites. One known communication system is a cellular communication system, such as the Global System for Mobile Communications (GSM). In the GSM system, a communication unit (e.g., a mobile or portable radiotelephone) that desires to communicate sends a channel request signal to a base site serving the coverage area in which the communication unit resides. Upon receiving the channel request signal, the serving base site allocates a communication resource for the communication. The communication resource comprises a coordinated pair of timeslots and frequencies (i.e., a first timeslot at an uplink frequency and a second timeslot at a downlink frequency). The timeslot at the uplink frequency supports transmissions from the communication unit to the serving base site; whereas, the timeslot at the downlink frequency supports transmissions from the serving base site to the communication unit.

Upon allocating the communication resource, the base site sends a channel designation signal to the communication unit via a common control channel. The channel designation signal contains the uplink timeslot and frequency, the downlink timeslot and frequency, and the transmit power for the communication unit. Upon receiving the channel designation signal, the communication unit tunes its transmitter and receiver to the designated timeslots and frequencies and begins communicating with a telephone network subscriber or another communication unit via the serving base site.

During a typical communication, the communication unit moves throughout the coverage area of the serving base site and the serving base site monitors a signal quality metric (e.g., received signal strength indication, RSSI) of the communication unit's uplink communication signal. To account for changes in RSSI as the communication unit moves, the serving base site will issue commands directing the communication unit to increase or decrease the communication unit's transmit power as the need arises.

Typically, as the communication unit moves to the periphery of the serving base site coverage area, the transmit power of the communication unit must be increased to account for an increase in path losses between the serving base site and the communication unit. Although the increased transmit power of the communication unit allows the serving base site to receive the communication unit's transmission, the increased transmit power also has the potential to interfere with an uplink communication signal at the same, or an adjacent, uplink frequency being used by a communication unit in another base site coverage area. That is, the higher power transmission of the communication unit can increase the cochannel or adjacent channel interference in the other coverage area as viewed by the base site serving that coverage area.

A known technique for mitigating the increased cochannel and adjacent channel interference introduced by an interfering communication unit is to reassign, or handoff, the communication unit that is being interfered with. This technique is described in detail in GSM Recommendation 05.08. Although this technique adequately mitigates the effects of the interference, it increases the handoff load of the system and fails to treat the cause of the interference (i.e., the interfering communication unit remains a potential interferer for the next communication unit that is allocated the previously interfered with uplink timeslot and frequency).

Therefore, a need exists for a method and apparatus for mitigating interference produced by a communication unit that eliminates the source of the of the interference without increasing the handoff load of the system.

DESCRIPTION OF A PREFERRED EMBODIMENT

Generally, the present invention encompasses a method and apparatus for mitigating interference produced by a communication unit communicating with a serving base site in a communication system. While the communication unit is communicating with the serving base site, the communication unit monitors a downlink communication signal transmitted by an alternate base site. The communication unit then determines an indicia of signal usability for the monitored downlink signal and, subsequently, adjusts a transmit power of the communication unit based on the indicia of signal usability. By adjusting the transmit power of a communication unit in this manner, the present invention reduces cochannel and adjacent channel interference produced by the communication unit, as perceived by the alternate base site, without increasing the handoff load of the alternate base site.

Figure 1:
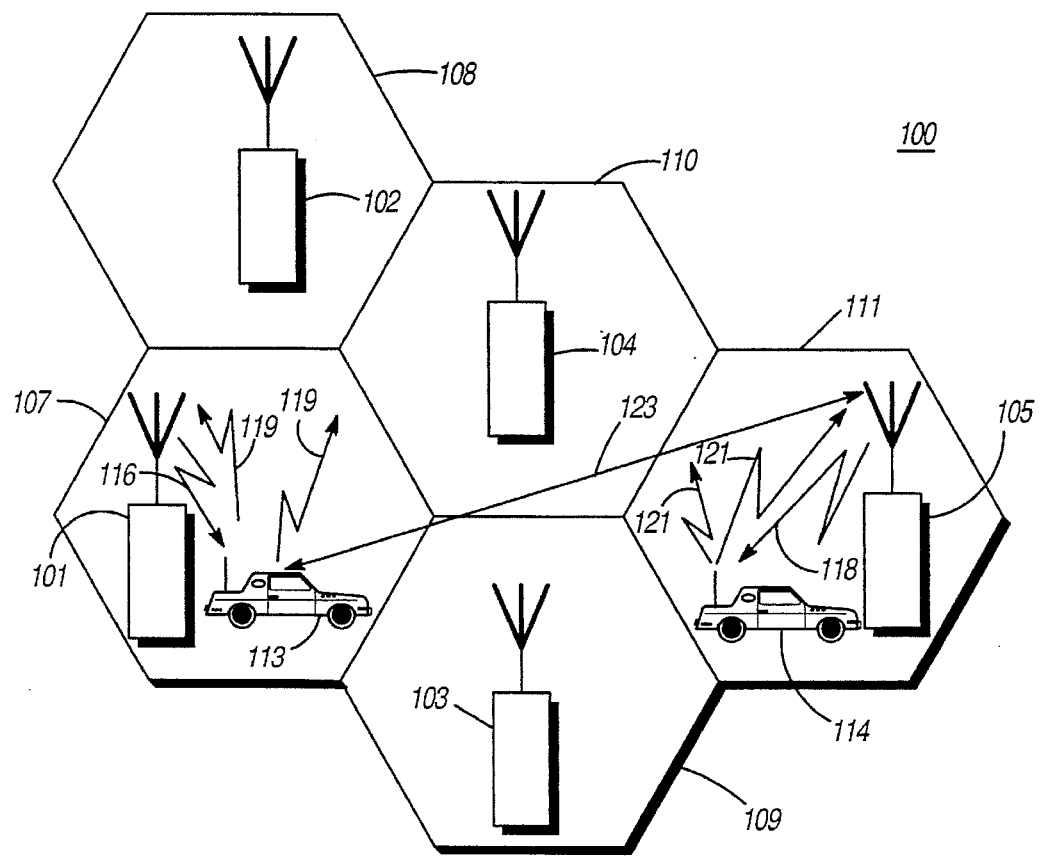
FIG. 1 illustrates a communication system in accordance with the present invention.

The present invention can be more fully described with reference to FIGS. 1–7. FIG. 1 illustrates a communication system 100 in accordance with the present invention. The communication system 100 includes a plurality of base sites 101–105 having respective service coverage areas 107–111 and a plurality of communication units 113–114. As shown, communication unit 113 is communicating with base site 101 via uplink communication signal 119 and base site 101 is communicating with communication unit 113 via downlink communication signal 116. Similarly, communication unit 114 is communicating with base site 105 via uplink communication signal 121 and base site 105 is communicating with communication unit 114 via downlink communication signal 118. In a preferred embodiment, the communication system 100 comprises an analog or digital cellular communication system, such as the Advanced Mobile Phone Service (AMPS) system, the GSM system, the Personal Digital Cellular system, or the United States Digital Cellular (USDC) system described in Electronic Industries Association/Telecommunications Association Industry Interim Standard 54 (IS-54). An exemplary communication unit (e.g., 113) and an exemplary base site (e.g., 101) are described in detail below with regard to FIGS. 2 and 3, respectively.

Operation of the communication system 100 in accordance with a preferred embodiment of the present invention occurs as follows. Communication unit 113, while communicating with serving base site 101, monitors a downlink communication signal 118 transmitted by a distant base site 105. In the preferred embodiment, the distant base site 105 is assigned to receive uplink frequencies that are either identical to, or adjacent to, the uplink frequencies assigned for reception by the serving base site 101. The downlink communication signal 118 preferably comprises a control signal that includes the identity of the distant base site 105. The communication unit 113 then determines an indicia of signal usability for the downlink communication signal 118. In a preferred embodiment this indicia comprises a received signal strength indication (RSSI). However, in an alternate embodiment the indicia might be related to a bit error rate (BER), a frame erasure rate (FER), a carrier to interference ratio (C/I), or a carrier to noise ratio (C/N). The communication unit 113 transmits the indicia of signal usability (e.g., RSSI) to the serving base site 101 via the uplink communication signal 119.

The serving base site 101 receives the uplink communication signal 119 and compares the indicia of signal usability to a usability threshold for the distant base site 105. In the preferred embodiment, the usability threshold is the RSSI level that corresponds to an undesired path loss between the communication unit 113 and the distant base site 105. When the indicia of signal usability exceeds the threshold, the serving base site 101 estimates a signal-to-noise ratio, as viewed by the distant base site 105, for the uplink communication signal 121 transmitted by the communication unit 114 being served by the distant base site 105.

The signal-to-noise ratio is estimated by first determining a signal propagation loss (i.e., path loss) between the distant base site 105 and the communication unit 113 over the path 123 therebetween. In this estimation, the "noise" effectively comprises the level of cochannel or adjacent channel interference produced by the interfering communication unit 113. In the preferred embodiment, the serving base site 101 determines the signal propagation loss by subtracting the RSSI measurement (in decibel units) contained in the uplink communication signal 119 received from the interfering communication unit 113 from the transmitted power (in decibel units) of the distant base site 105. The serving base site 101 then determines the signal power of the uplink communication signal 119 (i.e., the "noise") incident upon the distant base site 105 by adding the signal propagation loss to the transmit power of the interfering communication unit 113. In the preferred embodiment, the serving base site 101 includes a database that contains the transmit powers of the other base sites 102–105 and the transmit powers of active communication units (e.g., 113) in its service coverage area 107 in accordance with conventional handoff and uplink signal power control techniques. In addition, the 105 base site database preferably includes uplink power control parameters (e.g., desired uplink RSSI) for the other base stations 102–105. Thus, the serving base site 101 knows the desired RSSI level at which the distant base site 105 intends to receive an uplink communication signal 121 from a communication unit 114 in the distant base site's service coverage area 111.

After computing the noise (N) incident upon the distant base site 105 and retrieving the desired RSSI level (S) for an uplink communication signal 121 intended for reception by the distant base site 105, the serving base site 101 estimates the signal-to-noise ratio for the intended uplink communication signal 121 at the distant base site 105 by subtracting the signal power of the interfering uplink communication signal 119 from the desired RSSI level of the intended uplink communication signal 121. The computation of the signal-to-noise ratio in decibels (dB) is summarized by the following equation:

$$S/N_{ds}(dB) = \text{desired } RSSI_{ds} - [P_{Tint} - (P_{Tds} - RSSI_{int})]$$

where $S/N_{ds}$ is the signal-to-noise ratio for a particular uplink communication signal 121 as perceived by the distant base site 105, desired $RSSI_{ds}$ is the desired RSSI level at the distant base site 105 for the particular uplink communication signal 121, $P_{Tint}$ is the transmit power of the interfering communication unit 113, $(P_{Tds} - RSSI_{int})$ is the signal propagation loss between the distant base site 105 and the interfering communication unit 113 (i.e., transmit power of the distant base site ($P_{Tds}$) less RSSI at the interfering communication unit 113 ($RSSI_{int}$)). A skilled artisan will appreciate that the parameter $RSSI_{int}$ is the same parameter measured by communication units in communication systems that employ mobile assisted handoff (MAHO).

Upon estimating the signal-to-noise ratio at the distant base site 105, the serving base site 101 compares the signal-to-noise ratio to a signal-to-noise threshold. When the signal-to-noise ratio is below the signal-to-noise threshold (e.g., 13 dB in the GSM system), the serving base site 101 transmits a power control command to the interfering communication unit 113 that directs the interfering communication unit 113 to decrease its transmit power (i.e., the signal power of uplink communication signal 119) to a level that provides a signal-to-noise ratio for the uplink communication signal 121 at the distant base site 105 greater than or equal to the signal-to-noise threshold. Upon receiving the power control command, the interfering communication unit 113 decreases its transmit power as directed by the power control command, thereby reducing the interference produced by the interfering communication unit 113 as perceived by the distant base site 105.

Figures 2, 3:
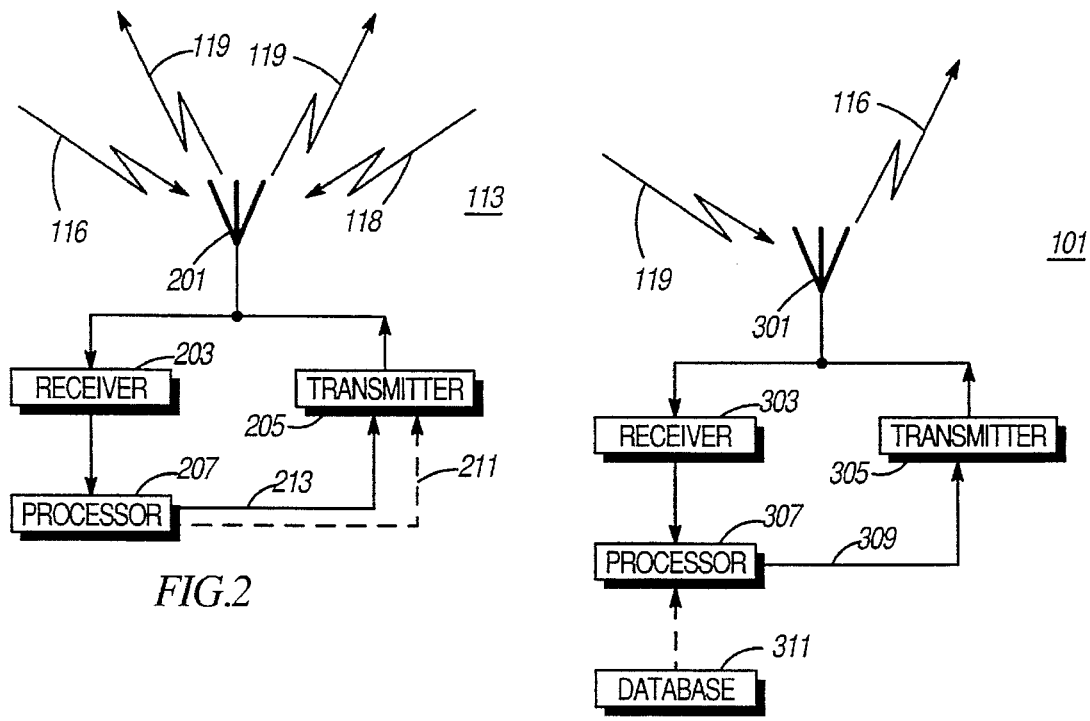
FIG. 2 illustrates a block diagram of a communication unit in accordance with the present invention.
FIG. 3 illustrates a block diagram of a base site in accordance with the present invention.

FIG. 2 illustrates a communication unit (e.g., 113) in accordance with the present invention. The communication unit 113 comprises, inter alia, an antenna 201, a receiver 203, a transmitter 205, and a processor 207. The receiver 203 preferably comprises well known front-end and backend circuitry, such as downconverters, mixers, filters, demodulators, and analog-to-digital converters that produce a baseband representation of the received downlink communication signal 116. The transmitter 205 preferably comprises mixers, amplifiers, attenuators, and modulation circuitry. The processor 207 preferably comprises a digital signal processor (DSP) or a microprocessor.

In a preferred embodiment, the communication unit 113 receives the downlink communication signals 116, 118 from the serving base site 101 and the distant base site 105, respectively, via the antenna 201. The downlink communication signal 118 received from the distant base site 105 is processed by the receiver 203 to determine an indicia of signal usability for the downlink communication signal 118. In a preferred embodiment, the indicia of signal usability is an RSSI. The RSSI is provided to the processor 207 where, in a preferred embodiment, the RSSI is configured within a transmit baseband signal 213. The transmit baseband signal 213 is provided to the transmitter 205 for transmission to the serving base site 101. The transmitter 205 transmits the RSSI to the serving base site 101 via the uplink communication signal 119.

When the communication unit 113 receives a downlink communication signal 116 from the serving base site 101, the received signal is processed by the receiver 203 to extract the transmitted baseband information, including the power control command when sent. The receiver 203 provides the baseband information to the processor 207. The processor 207 interprets the power control command and generates a power control signal 211 that directs the transmitter 205 to adjust (i.e., increase or decrease) its transmit power. For example, when the serving base site 101 determines that the signal-to-noise ratio at the distant base site 105 is less than the signal-to-noise threshold, the power control command instructs the communication unit 113 to decrease its transmit power and the power control signal 211 (e.g., a direct current control voltage) directs the transmitter 205 accordingly.

In an alternative embodiment, when the communication unit 113 receives the downlink communication signal 118 from the distant base site 105, the processor 207 might additionally compare the received RSSI to a usability threshold to determine whether or not to include the RSSI within the transmit baseband signal 213 and to transmit the RSSI to the serving base site 101. The usability threshold is the same threshold as would be used at the serving base site 101 (e.g., 13 dB for a GSM system). When the processor 207 determines that the received RSSI exceeds the usability threshold, the processor generates the transmit baseband signal 213, including the RSSI, and forwards the transmit baseband signal 213 to the transmitter 205 for transmission to the serving base site 101. Thus, in this embodiment, the communication unit 113 performs a preliminary evaluation of the usability of the downlink signal 118 received from the distant base site 105. By performing this preliminary evaluation at the communication unit 113, the amount of signaling between the communication unit 113 and the serving base site 101 can be reduced. The drawback to this approach is that the serving base site 101, or some other means, must provide the usability threshold to the communication unit 113. For example, the serving base site 101 might transmit a list of usability thresholds for various alternate base sites 102–105 to the communication unit 113 as part of the control information transmitted during the call set-up procedure.

In yet another embodiment, the communication unit 113 might receive a downlink communication signal 116 from the serving base site 101 that includes the pertinent information (e.g., transmit power of the distant base site 105, the desired uplink RSSI at the distant base site 105, and the signal-to-noise threshold) that the serving base site 101 uses in the preferred embodiment to estimate the signal-to-noise ratio for the uplink communication signal 121 at the distant base site 105. In this embodiment, when the communication unit 113 receives the downlink communication signal 118 from the distant base site 105, the processor 207 compares the received RSSI to the usability threshold. When the received RSSI exceeds the usability threshold, the communication unit 113 estimates the signal-to-noise ratio for the uplink communication signal 121 at the distant base site 105. The processor 207 then compares the estimated signal-to-noise ratio with the signal-to-noise threshold. When the estimated signal-to-noise ratio is below the signal-to-noise threshold, the processor 207 directs the transmitter 205, via the power control signal 211, to decrease the communication unit's transmit power. Therefore, in this embodiment, the communication unit 113 controls its own interference power, independent of the serving base site 101. The drawback to this approach is that the communication unit 113 would require additional memory and processing capabilities to be able to perform the signal-to-noise computations for all the base sites with which it may be interfering.

FIG. 3 illustrates a base site (e.g., 101) in accordance with the present invention. The base site 101 comprises, inter alia, an antenna 301, a receiver 303, a transmitter 305, a processor 307, and a database 311. The receiver 303 preferably comprises well known front-end and backend circuitry, such as downconverters, mixers, filters, demodulators, and analog-to-digital converters that produce a baseband representation of the received uplink communication signal 119. The transmitter 305 preferably comprises mixers, amplifiers, attenuators, and modulation circuitry. The processor 307 preferably comprises a DSP or a microprocessor. The database 311 preferably comprises a random access memory (RAM) that contains uplink power control parameters, such as a desired RSSI level and a signal-to-noise threshold, for the distant base sites (102–105 in FIG. 1), the transmit power of the distant base sites 102–105, and the transmit powers of the communication units (e.g., 113) that are registered for service in the base site's service coverage area (107 in FIG. 1).

In a preferred embodiment, the base site 101 receives the uplink communication signal 119, including the indicia of signal usability for a distant base site's downlink communication signal (118 in FIG. 1), from a communication unit 113 via the antenna 301. The uplink communication signal 119 is then processed by the receiver 303 to extract the indicia of signal usability. The processor compares the indicia of signal usability to a usability threshold. When the indicia of signal usability exceeds the usability threshold, the processor 307 accesses the database 311 to obtain the parameters necessary to estimate the signal-to-noise ratio at the distant base site (e.g., 105 in FIG. 1). The processor 307 estimates the signal-to-noise ratio at the distant base site 105, as discussed above with regard to FIG. 1, compares the signal-to-noise ratio to the signal-to-noise threshold for the distant base site 105 stored in the database 311, and generates a power control command 309 based on the comparison. When the signal-to-noise ratio is less than the signal-to-noise threshold, the power control command 309 instructs the communication unit 113 to decrease its transmit power. However, when the signal-to-noise ratio meets or exceeds the signal-to-noise threshold, the power control command 309 might instruct the communication unit 113 to increase its transmit power, provided the communication unit 113 is not currently operating at maximum transmit power, or the processor 307 might not generate the power control command 309. The power control command 309, when generated, is provided to the transmitter 305 for transmission to the communication unit 113. The transmitter 305 transmits the power control command 309 to the communication unit 113 via the downlink communication signal 116.

In the alternative embodiment discussed above with regard to FIG. 2, wherein the communication unit 113 performs the comparison of the indicia of signal usability to the usability threshold, the base site 101, upon receiving an uplink communication signal 119 that includes the indicia of signal usability, proceeds directly with estimating the signal-to-noise ratio at the distant base site 105, comparing the signal-to-noise ratio to the signal-to-noise threshold for the distant base site 105 stored in the database 311, and generating, if necessary, the power control command 309 based on the comparison.

The present invention provides for control of a communication unit's transmit power to reduce the amount of interference produced by the communication unit when the level of interference produced is substantial enough to degrade system performance at a base site receiving the interfering signal. The present invention uses MAHO measurements that are conventionally used to facilitate handoff to facilitate interference mitigation through transmit power control. Unlike typical power control schemes in which the serving base site monitors the RSSI level of an uplink signal from a communication unit and instructs the communication unit to change transmit power based on the monitored level, the present invention uses the signal usability of a downlink signal from a distant base site (i.e., the MAHO measurement) as the dispositive factor for controlling the communication unit's transmit power to mitigate interference. In addition, the present invention permits cochannel and adjacent channel interference mitigation without requiring the base site receiving the interference to rely on handoffs to overcome the system performance degradation caused by the interference.

Figure 4:
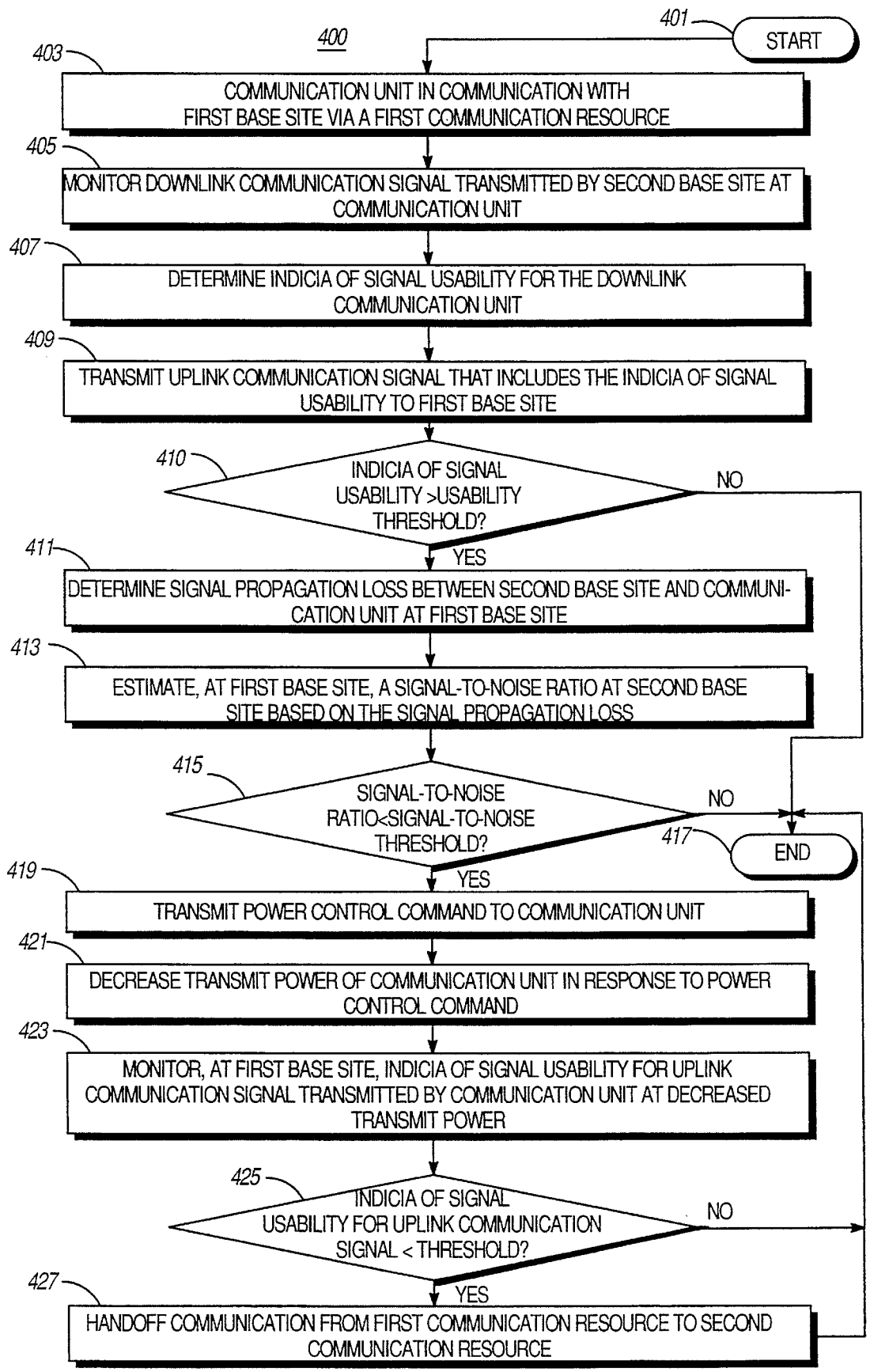
FIG. 4 illustrates a logic flow diagram of steps executed by a base site and a communication unit in accordance with a preferred embodiment of the present invention.

FIG. 4 illustrates a logic flow diagram 400 of steps executed by a base site and a communication unit in accordance with a preferred embodiment of the present invention. The logic flow begins (401) when the communication unit is in communication (403) with a first, or serving, base site of the communication system via a first communication resource. That is, the communication unit is transmitting an uplink voice or data communication signal to the first base site via an uplink channel of the first communication resource and the first base site is transmitting a downlink voice, data, or control communication signal to the communication unit via a downlink channel of the first communication resource. In the preferred embodiment, the uplink and downlink channels of the first communication resource each comprises a timeslot at a corresponding uplink or downlink frequency in accordance with known time division multiple access (TDMA) techniques.

While the communication unit is communicating with the first base site, the communication unit monitors (405) a downlink communication signal (e.g., a common control signal) transmitted by a second, or distant, base site. The second base site is preferably configured to receive uplink communication signals at either the same frequency as, or a frequency substantially adjacent to, the frequency of the uplink communication signal transmitted by the communication unit. Upon receiving the downlink communication signal from the second base site, the communication unit determines (407) an indicia of signal usability for the downlink communication signal. In the preferred embodiment, this determination comprises an RSSI. The communication unit then transmits (409) the indicia of signal usability to the first base site as part of an uplink communication signal.

Upon receiving the indicia of signal usability from the communication unit, the first base site first compares (410) the indicia of signal usability to a usability threshold. When the indicia of signal usability is less than or equal to the usability threshold, the first base site takes no further action and the logic flow ends (417). However, when the indicia of signal usability exceeds the usability threshold, the first base site determines (411) the signal propagation loss between the second base site and the communication unit based on the indicia of signal usability (RSSI) and the transmit power of the second base site. In a preferred embodiment, this determination is simply a subtraction of the RSSI (in dB units) of the downlink communication signal from the transmit power (in dB units) of the second base site. Upon determining the signal propagation, or path, loss between the communication unit and the second base site, the first base site uses the signal propagation loss to estimate (413) a signal-to-noise ratio at the second base site. The signal-to-noise ratio computation is described in detail above with regard to FIG. 1. The first base site then compares (415) the estimated signal-to-noise ratio to a signal-to-noise threshold for the second base site. The signal-to-noise threshold preferably comprises the minimum acceptable signal-to-noise ratio to maintain a particular signal quality. For example, in the GSM cellular system, the signal-to-noise threshold is approximately 13 dB.

In the preferred embodiment, when the signal-to-noise ratio is greater than or equal to the signal-to-noise threshold, the first base site takes no further action and the logic flow ends (417). However, when the signal-to-noise ratio is less than the signal-to-noise threshold, the first base site generates a power control command instructing the communication unit to decrease its transmit power by either a predetermined amount (e.g., 2 dB) or an amount (in dB) equal to the difference between the signal-to-noise ratio and the signal-to-noise threshold. The first base site then transmits (419) the power control command to the communication unit via a downlink communication signal. Upon receiving the power control command, the communication unit decreases (421) its transmit power by the predetermined mount and continues communicating with the first base site.

After the communication unit decreases its transmit power, the first base site monitors (423) an indicia of signal usability for the uplink communication signal transmitted by the communication unit. This indicia preferably comprises an RSSI, although other indicia related to BER, FER, C/I, and C/N might alternatively be used. The first base site compares (425) the indicia of signal usability for the uplink communication signal to a threshold (e.g., 13 dB for a GSM-type cellular system). When the indicia is greater than or equal to the threshold, the first base site takes no further action and the logic flow ends (417). However, when the indicia is less than the threshold, the first base site hands off the communication unit from the first communication resource to a second communication resource at either the first base site or an alternate base site of the communication system. Thus, when the communication unit's transmit power has been decreased to a level that is too low to maintain quality communications on the first communication resource, the first base site hands off the communication to another communication resource and the logic flow ends (417).

Figure 5:
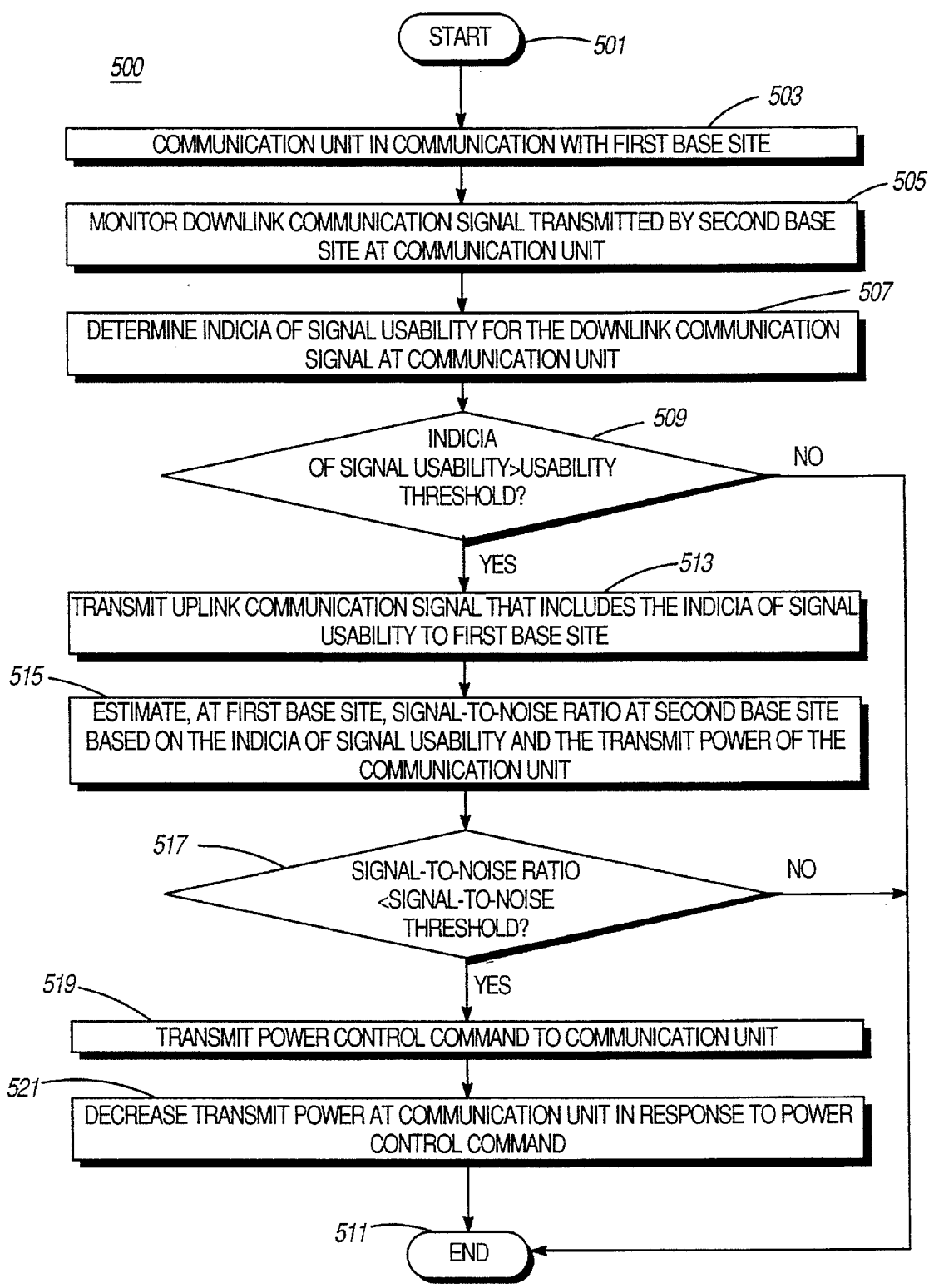
FIG. 5 illustrates a logic flow diagram of steps executed by a base site and a communication unit in accordance with a first alternative embodiment of the present invention.

FIG. 5 illustrates a logic flow diagram 500 of steps executed by a base site and a communication unit in accordance with a first alternative embodiment of the present invention. The logic flow begins (501) when the communication unit is in communication (503) with a first base site of the communication system. Similar to the logic flow of FIG. 4, the communication unit monitors (505) a downlink communication signal transmitted by a second base site and determines (507) an indicia of signal usability for the downlink communication signal. However, in this embodiment, the communication unit compares (509) the indicia of signal usability to a usability threshold. When the indicia of signal usability is less than or equal to the usability threshold, the communication unit takes no further action and the logic flow ends (511).

However, when the indicia of signal usability exceeds the usability threshold, the communication unit transmits (513) an uplink communication signal containing the indicia of signal usability to the first base site. Then, similar to the logic flow of FIG. 4, the first base site estimates (515) the signal-to-noise ratio at the second base site based on the indicia of signal usability and the transmit power of the communication unit, compares (517) the signal-to-noise ratio to a signal-to-noise threshold, and, when the signal-to-noise ratio is less than the signal-to-noise threshold, transmits (519) a power control to the communication unit instructing the communication unit to decrease its transmit power. Upon receiving the power control command, the communication unit decreases (521) its transmit power and the logic flow ends (511).

Figure 6:
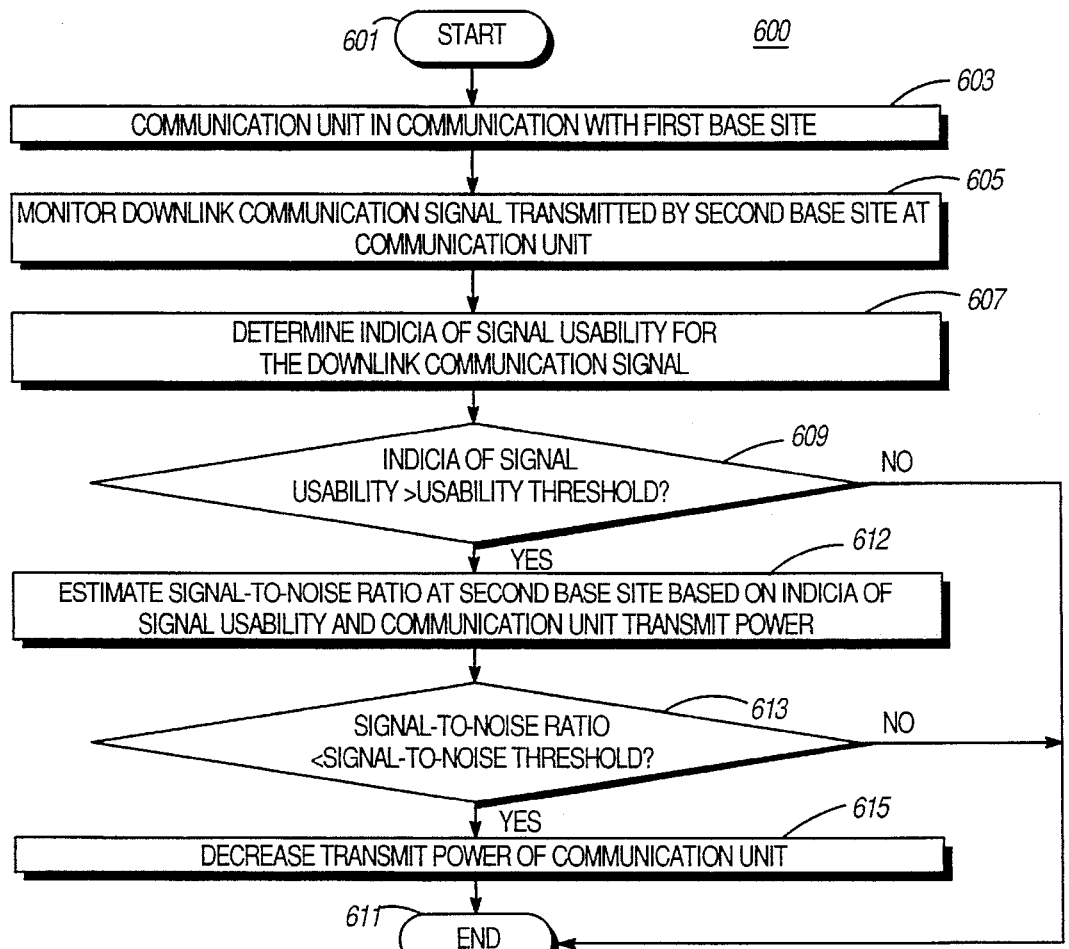
FIG. 6 illustrates a logic flow diagram of steps executed by a communication unit in accordance with a second alternative embodiment of the present invention.

FIG. 6 illustrates a logic flow diagram 600 of steps executed by a communication unit in accordance with a second alternative embodiment of the present invention. The logic flow begins (601) when the communication unit is in communication (603) with a first base site of the communication system. Similar to the logic flows of FIGS. 4 and 5, the communication unit monitors (605) a downlink communication signal transmitted by a second base site and determines (607) an indicia of signal usability for the downlink communication signal. However, in this embodiment, the communication unit performs all the functions of the first base site with regard to controlling the transmit power of the communication unit to mitigate interference.

Continuing, the communication unit compares (609) the indicia of signal usability to a usability threshold. When the indicia of signal usability is less than or equal to the usability threshold, the communication unit takes no further action and the logic flow ends (611). However, when the indicia of signal usability exceeds the usability threshold, the communication unit estimates (612) the signal-to-noise ratio at the second base site based on the indicia of signal usability and the communication unit's transmit power, and compares (613) the signal-to-noise ratio to a signal-to-noise threshold. To facilitate this estimation and comparison, while minimizing the amount of memory necessary at the communication unit, the communication unit might request the necessary quantities (e.g., desired RSSI level, transmit power of the second base site, and signal-to-noise threshold) from the first base site's database to perform the signal-to-noise computation and comparison. Alternatively, the communication unit might maintain its own database and receive database updates from the first base site.

When the signal-to-noise ratio is greater than or equal to the signal-to-noise threshold, the communication unit takes no further action and the logic flow ends (611). However, when the signal-to-noise ratio is less than the signal-to-noise threshold, the communication unit decreases (615) its transmit power by either a predetermined amount (e.g., 2 dB) or an amount (in dB) equal to the difference between the signal-to-noise ratio and the signal-to-noise threshold, and the logic flow ends (611).

Figure 7:
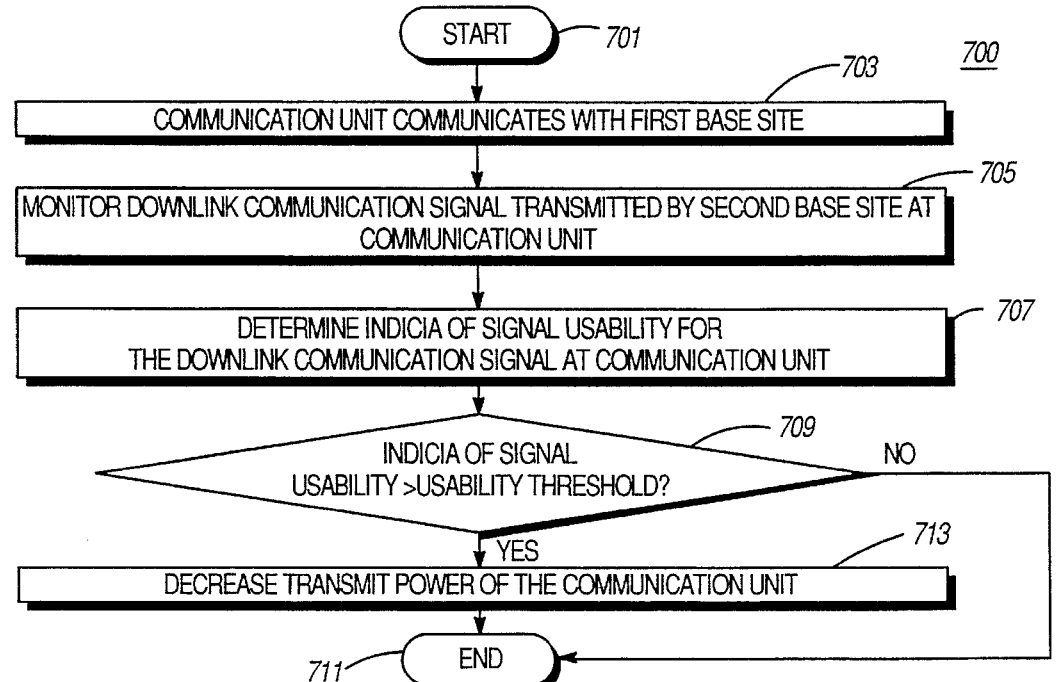
FIG. 7 illustrates a logic flow diagram of steps executed by a communication unit in accordance with a third alternative embodiment of the present invention.

FIG. 7 illustrates a logic flow diagram 700 of steps executed by a communication unit in accordance with a third alternative embodiment of the present invention. The logic flow begins (701) when the communication unit is in communication (703) with a first base site of the communication system. Similar to the logic flow of FIG. 6, the communication unit monitors (705) a downlink communication signal transmitted by a second base site, determines (707) an indicia of signal usability for the downlink communication signal, and compares (709) the indicia of signal usability to a usability threshold. When the indicia of signal usability is less than or equal to the usability threshold, the communication unit takes no further action and the logic flow ends (711). However, when the indicia of signal usability exceeds the usability threshold, the communication unit decreases (713) its transmit power by a predetermined amount and the logic flow ends (711). Although this embodiment appears to be the most straightforward approach to interference mitigation, it is not the preferred embodiment because it has a much larger margin for error than does basing the power control decision on whether or not the estimated signal-to-noise ratio at the second base site is less than a signal-to-noise threshold.

The present invention encompasses a method and apparatus for mitigating interference produced by a communication unit communicating with a serving base site in a communication system. With this invention, cochannel and adjacent channel interference produced by the communication unit and received by a distant base site can be mitigated without requiring the distant base site to increase its handoff burden. Thus, the present invention controls the source of the interference (i.e., the interfering communication unit) instead of the using handoffs to avoid the interference as in the prior art. In addition, the present invention advantageously uses common MAHO measurements to control the transmit power of a communication unit and thereby mitigate interference produced by the communication unit.

While the invention has been particularly shown and described with reference to particular embodiments thereof, it will be understood by those skilled in the art that various changes in form and details may be made therein without departing from the spirit and scope of the invention.

What is claimed is:

1. A method for mitigating interference produced by a communication unit communicating with a first base site in a communication system, the method comprising the steps of:

a) monitoring, by the communication unit, a downlink communication signal transmitted from a second base site;

b) determining, by the communication unit, an indicia of signal usability for the downlink communication signal; and c) comparing the indicia of signal usability to a usability threshold for the second base site; and d) when the indicia of signal usability exceeds the usability threshold, decreasing the transmit power of the communication unit.

2. The method of claim 1, wherein the indicia of signal usability comprises a received signal strength indication.

3. A method for mitigating interference produced by a communication unit communicating with a first base site in a communication system, the method comprising the steps of:

a) monitoring, by the communication unit, a downlink communication signal transmitted from a second base site;

b) determining, by the communication unit, an indicia of signal usability for the downlink communication signal;

c) transmitting, by the communication unit, an uplink communication signal to the first base site, the uplink communication signal including the indicia of signal usability;

d) estimating, by the first base site, a signal-to-noise ratio at the second base site based on the indicia of signal usability and a transmit power of the communication unit; and e) when the signal-to-noise ratio is below a signal-to-noise threshold, transmitting, by the first base site, a power control command that directs the communication unit to decrease the transmit power of the communication unit.

4. A communication unit communicating with a first base site, the communication unit comprising:

a receiver that receives a downlink communication signal from a second base site and determines an indicia of signal usability for the downlink communication signal; and a processor, operably coupled to the receiver, that compares the indicia of signal usability to a usability threshold and, when the indicia of signal usability exceeds the usability threshold, decreases the transmit power of the communication unit.

5. The communication unit of claim 4, further comprising:

a transmitter, operably coupled to the processor, that transmits an uplink communication signal to the first base site, the uplink communication signal including the indicia of signal usability.

6. A base site comprising:

a receiver that receives an uplink communication signal from a communication unit, the uplink communication signal including an indicia of signal usability for a downlink communication signal transmitted from an alternate base site to the communication unit;

a processor, operably coupled to the receiver, that estimates a signal-to-noise ratio at the alternate base site based on the indicia of signal usability and a transmit power of the communication unit and, when the signal-to-noise ratio is less than a signal-to-noise threshold, generates a power control command; and a transmitter, operably coupled to the processor, that transmits the power control command to the communication unit.

7. A method for mitigating interference produced by a communication unit communicating with a first base site in a communication system, the method comprising the steps of:

a) monitoring, by the communication unit, a downlink communication signal transmitted from a second base site;

b) determining, by the communication unit, an indicia of signal usability for the downlink communication signal; and c) comparing the indicia of signal usability to a usability threshold for the second base site;

d) when the indicia of signal usability exceeds the usability threshold, estimating a signal-to-noise ratio at the second base site based on the indicia of signal usability and the transmit power of the communication unit; and e) when the signal-to-noise ratio is less than a signal-to-noise threshold, decreasing the transmit power of the communication unit.

8. The method of claim 7, wherein step (d) comprises the steps of:

(d1) determining a signal propagation loss from the second base site to the communication unit based on the indicia of signal usability; and (d2) estimating the signal-to-noise ratio at the second base site based on the signal propagation loss and the transmit power of the communication unit.

9. A method for mitigating interference produced by a communication unit communicating with a first base site in a communication system, wherein the communication unit communicating with the first base site via a first communication resource and the first communication resource includes an uplink channel and a downlink channel, the method comprising the steps of:

a) monitoring, by the communication unit, a downlink communication signal transmitted from a second base site;

b) determining, by the communication unit, an indicia of signal usability for the downlink communication signal; and c) decreasing the transmit power of the communication unit based on the indicia of signal usability to produce a decreased transmit power;

d) monitoring, by the first base site, an indicia of signal usability for an uplink communication signal transmitted by the communication unit at the decreased transmit power via the uplink channel; and e) when the indicia of signal usability for the uplink communication signal is below a threshold, handing off the communication unit from the first communication resource to a second communication resource.

10. A method for mitigating interference produced by a communication unit communicating with a first base site in a communication system, the method comprising the steps of:

a) monitoring, by the communication unit, a downlink communication signal transmitted from a second base site;

b) determining, by the communication unit, an indicia of signal usability for the downlink communication signal; and c) comparing, by the communication unit, the indicia of signal usability to a usability threshold for the second base site;

d) when the indicia of signal usability exceeds the usability threshold, transmitting, by the communication unit, an uplink communication signal to the first base site, the uplink communication signal including the indicia of signal usability;

e) estimating, by the first base site, a signal-to-noise ratio at the second base site based on the indicia of signal usability and the transmit power of the communication unit;

f) when the signal-to-noise ratio is less than a signal-to-noise threshold, transmitting, by the first base site, a power control command to the communication unit; and g) decreasing, by the communication unit, the transmit power of the communication unit in response to the power control command.

11. The method of claim 10, wherein step (e) comprises the steps of:

e1) determining a signal propagation loss from the second base site to the communication unit based on the indicia of signal usability; and e2) estimating the signal-to-noise ratio at the second base site based on the signal propagation loss and the transmit power of the communication unit.

12. A method for mitigating interference produced by a communication unit communicating with a first base site in a communication system, the method comprising the steps of:

a) monitoring, by the communication unit, a downlink communication signal transmitted from a second base site;

b) determining, by the communication unit, an indicia of signal usability for the downlink communication signal; and c) transmitting, by the communication unit, an uplink communication signal to the first base site, the uplink communication signal including the indicia of signal usability;

d) comparing, by the first base site, the indicia of signal usability to a usability threshold for the second base site;

e) when the indicia of signal usability exceeds the usability threshold, estimating, by the first base site, a signal-to-noise ratio at the second base site based on the indicia of signal usability and the transmit power of the communication unit;

f) when the signal-to-noise ratio is less than a signal-to-noise threshold, transmitting, by the first base site, a power control command to the communication unit; and g) decreasing, by the communication unit, the transmit power of the communication unit in response to the power control command.

13. The method of claim 12, wherein step (e) comprises the steps of:

e1) determining a signal propagation loss from the second base site to the communication unit based on the indicia of signal usability; and e2) estimating the signal-to-noise ratio at the second base site based on the signal propagation loss and the transmit power of the communication unit.

14. The method of claim 12, further comprising the steps of:

h) when the signal-to-noise ratio is greater than or equal to the signal-to-noise threshold, transmitting, by the first base site, an alternate power control command to the communication unit; and i) increasing, by the communication unit, the transmit power of the communication unit in response to the alternate power control command.

15. A communication unit communicating with a first base site, the communication unit comprising:

a receiver that receives a downlink communication signal from a second base site and determines an indicia of signal usability for the downlink communication signal; and a processor, operably coupled to the receiver, that estimates a signal-to-noise ratio at the second base site based on the indicia of signal usability and the transmit power of the communication unit and, when the signal-to-noise ratio is less than a signal-to-noise threshold, decreases the transmit power of the communication unit.

16. A base site comprising:

a receiver that receives an uplink communication signal from a communication unit, the uplink communication signal including an indicia of signal usability for a downlink communication signal transmitted from an alternate base site to the communication unit;

a processor, operably coupled to the receiver, that generates a power control command based on the indicia of signal usability;

a database, operably coupled to the processor, that contains uplink power control parameters for the alternate base site; and a transmitter, operably coupled to the processor, that transmits the power control command to the communication unit.

17. The base site of claim 16, wherein the uplink power control parameters comprise a desired received signal strength and a signal-to-noise threshold.

* * * * *